US006318291B1

(12) United States Patent
Wolanski

(10) Patent No.: US 6,318,291 B1
(45) Date of Patent: Nov. 20, 2001

(54) PET BOWL WITH MEANS TO NOTIFY A PET OWNER THAT THE BOWL IS EMPTY

(76) Inventor: Michael Wolanski, 198 Idle Hour Blvd., Oakdale, NY (US) 11769

( * ) Notice: Subject to any disclaimer, the term of this patent is extended or adjusted under 35 U.S.C. 154(b) by 0 days.

(21) Appl. No.: 09/456,776

(22) Filed: Dec. 8, 1999

(51) Int. Cl.[7] ............................... A01K 5/01; A01K 7/00
(52) U.S. Cl. .................................................. 119/61; 119/74
(58) Field of Search ........................ 119/51.5, 61, 69.5, 119/74; 220/694

(56) References Cited

U.S. PATENT DOCUMENTS

| | | | |
|---|---|---|---|
| 4,630,569 | * | 12/1986 | Dieleman ............................ 119/69.5 |
| 4,733,634 | * | 3/1988 | Hooser .............................. 119/51.5 X |
| 4,735,171 | * | 4/1988 | Essex ................................ 119/51.5 X |
| 5,138,980 | | 8/1992 | Ewing ..................................... 119/73 |
| 5,231,953 | | 8/1993 | Garrett ................................... 119/61 |

FOREIGN PATENT DOCUMENTS

1340682 * 9/1987 (SU) ..................................... 119/61

* cited by examiner

Primary Examiner—Robert P. Swiatek
(74) Attorney, Agent, or Firm—Goldstein Law Offices, P.C.

(57) ABSTRACT

A pet bowl able to notify a pet owner that the bowl is empty including a bowl portion adapted for holding quantities of food and water therein and positionable on a recipient surface. A pressure sensor is secured to the bowl portion. The pressure sensor includes an upper sensor that is secured to the bowl portion and a lower sensor that is positionable against the recipient surface. A speaker is positioned under the bowl portion adjacent to the pressure sensor. The speaker is in communication with the pressure sensor. The speaker has a preprogrammed announcement stored therein.

2 Claims, 2 Drawing Sheets

PET BOWL WITH MEANS TO NOTIFY A PET OWNER THAT THE BOWL IS EMPTY

BACKGROUND OF THE INVENTION

The present invention relates to a pet bowl with means to notify a pet owner that the bowl is empty and more particularly pertains to letting a pet owner know that their pet is without food or water so that the bowl can be refilled.

The use of animal feeding devices is known in the prior art. More specifically, animal feeding devices heretofore devised and utilized for the purpose of providing food and water for pets are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,231,953 to Garrett discloses a dog dish with battery powered temperature and fluid sensors incorporated. U.S. Pat. No. 5,138,980 to Ewing discloses an animal feeding apparatus with a temperature control system incorporated.

While these devices fulfill their respective, particular objective and requirements, the aforementioned patents do not describe a pet bowl with means to notify a pet owner that the bowl is empty for letting a pet owner know that their pet is without food or water so that the bowl can be refilled.

In this respect, the pet bowl with means to notify a pet owner that the bowl is empty according to the present invention substantially departs from the conventional concepts and designs of the prior art, and in doing so provides an apparatus primarily developed for the purpose of letting a pet owner know that their pet is without food or water so that the bowl can be refilled.

Therefore, it can be appreciated that there exists a continuing need for a new and improved pet bowl with means to notify a pet owner that the bowl is empty which can be used for letting a pet owner know that their pet is without food or water so that the bowl can be refilled. In this regard, the present invention substantially fulfills this need.

SUMMARY OF THE INVENTION

In the view of the foregoing disadvantages inherent in the known types of animal feeding devices now present in the prior art, the present invention provides an improved pet bowl with means to notify a pet owner that the bowl is empty. As such, the general purpose of the present invention, which will be described subsequently in greater detail, is to provide a new and improved pet bowl with means to notify a pet owner that the bowl is empty which has all the advantages of the prior art and none of the disadvantages.

To attain this, the present invention essentially comprises a bowl portion having a generally frustoconical configuration. The bowl portion has a narrow open upper end and a wide open lower end. The wide open lower end is positionable on a recipient surface. The bowl portion includes a semi-spherical holding portion secured to the narrow open upper end thereof. The semi-spherical holding portion has an open upper end and an arcuate closed lower end. The semi-spherical holding portion is adapted for holding quantities of food and water therein. The arcuate closed lower end is elevated with respect to the wide open lower end of the bowl portion. A pressure sensor is secured to the arcuate closed lower end of the semi-spherical holding portion of the bowl portion. The pressure sensor includes an upper sensor that is secured to the arcuate closed lower end of the semi-spherical holding portion and a lower sensor that is positionable against the recipient surface. A speaker is positioned under the wide open lower end of the bowl portion adjacent to the pressure sensor. The speaker is in communication with the pressure sensor. The speaker has a preprogrammed announcement stored therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet bowl with means to notify a pet owner that the bowl is empty which has all the advantages of the prior art animal feeding devices and none of the disadvantages.

It is another object of the present invention to provide a new and improved pet bowl with means to notify a pet owner that the bowl is empty which may be easily and efficiently manufactured and marketed.

It is a further object of the present invention to provide a new and improved pet bowl with means to notify a pet owner that the bowl is empty which is of durable and reliable construction.

An even further object of the present invention is to provide a new and improved pet bowl with means to notify a pet owner that the bowl is empty which is susceptible of a low cost of manufacture with regard to both materials and labor, and which accordingly is then susceptible of low prices of sale to the consuming public, thereby making such a pet bowl with means to notify a pet owner that the bowl is empty economically available to the buying public.

Even still another object of the present invention is to provide a new and improved pet bowl with means to notify a pet owner that the bowl is empty for letting a pet owner know that their pet is without food or water so that the bowl can be refilled.

Lastly, it is an object of the present invention to provide a new and improved pet bowl with means to notify a pet owner that the bowl is empty including a bowl portion adapted for holding quantities of food and water therein and positionable on a recipient surface. A pressure sensor is secured to the bowl portion. The pressure sensor includes an upper sensor that is secured to the bowl portion and a lower sensor that is positionable against the recipient surface. A speaker is positioned under the bowl portion adjacent to the pressure sensor. The speaker is in communication with the pressure sensor. The speaker has a preprogrammed announcement stored therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
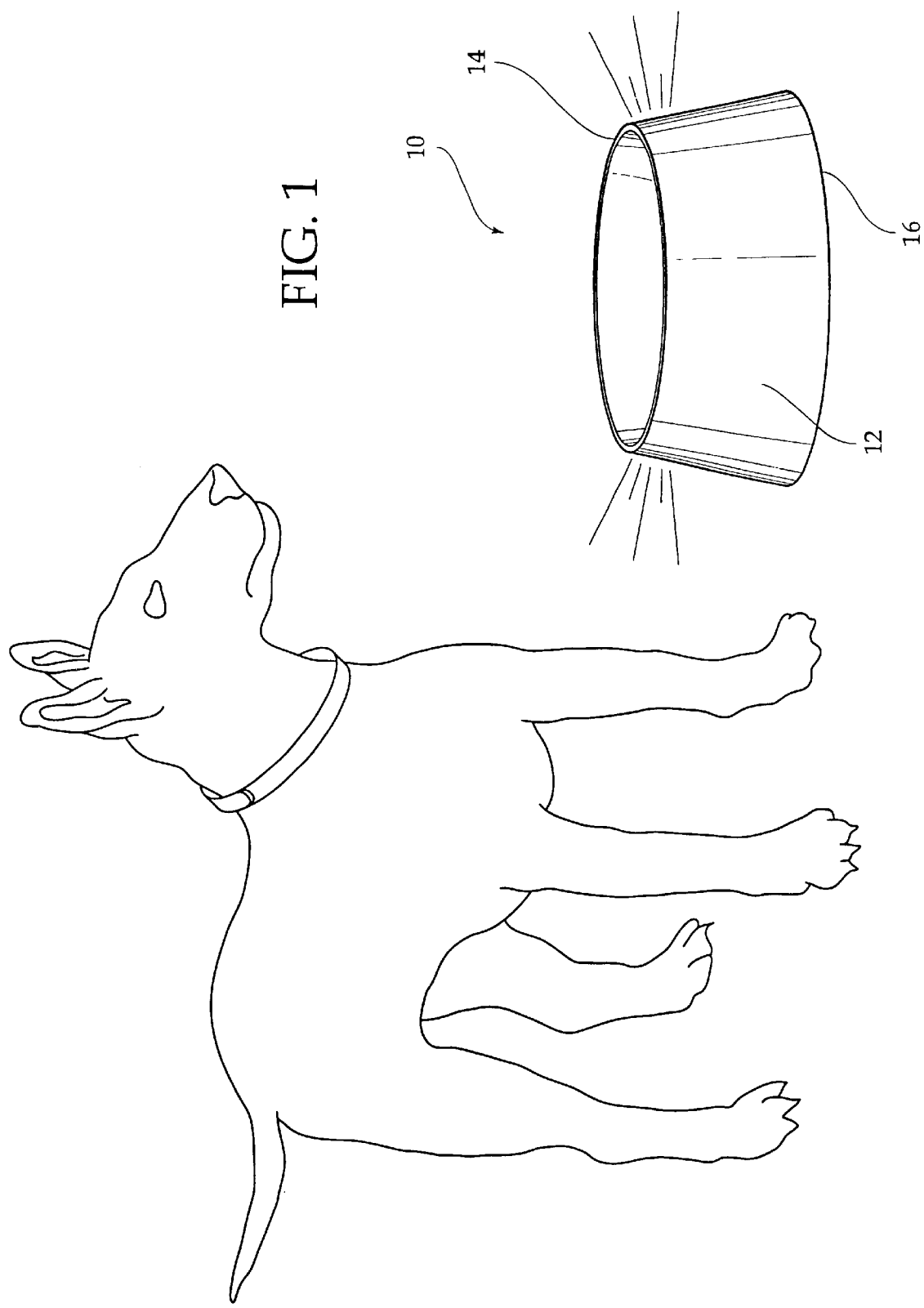
FIG. 1 is a perspective view of the preferred embodiment of the pet bowl with means to notify a pet owner that the bowl is empty constructed in accordance with the principles of the present invention.
Figure 3:
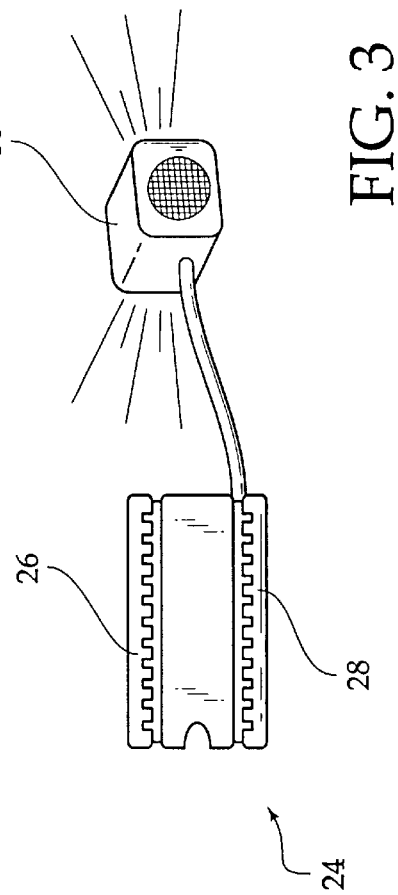
FIG. 3 is a perspective view of the pressure sensor and the speaker of the present invention.
Figure 2:
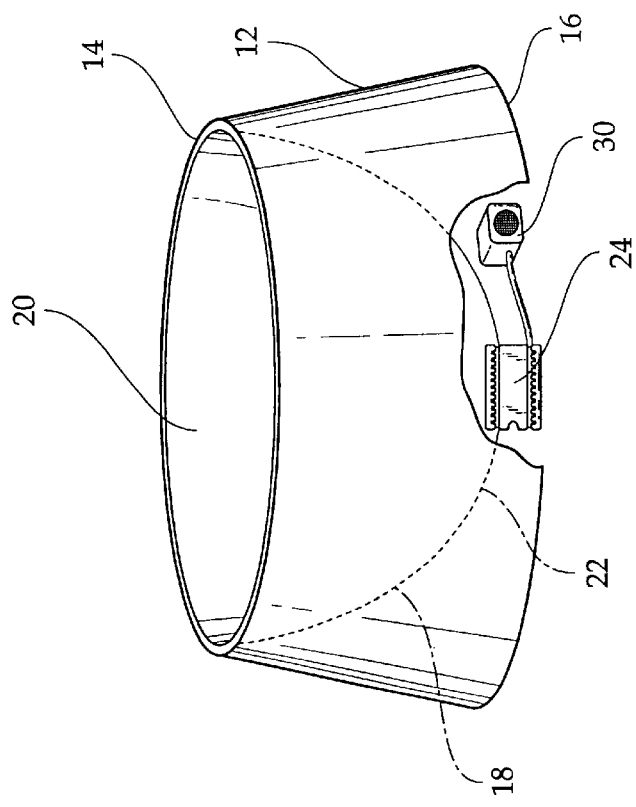
FIG. 2 is a side view of the bowl portion with a cut-away illustrating the pressure sensor and the speaker of the present invention.

With reference now to the drawings, and in particular, to FIGS. 1 through 3 thereof, the preferred embodiment of the new and improved pet bowl with means to notify a pet owner that the bowl is empty embodying the principles and concepts of the present invention and generally designated by the reference number 10 will be described.

Specifically, it will be noted in the various Figures that the device relates to a pet bowl with means to notify a pet owner that the bowl is empty for letting a pet owner know that their pet is without food or water so that the bowl can be refilled. In its broadest context, the device consists of a bowl portion, a pressure sensor, and a speaker. Such components are individually configured and correlated with respect to each other so as to attain the desired objective.

The bowl portion 12 has a generally frustoconical configuration. The bowl portion 12 has a narrow open upper 14 end and a wide open lower end 16. The wide open lower end 16 is positionable on a recipient surface. The bowl portion 12 includes a semi-spherical holding portion 18 secured to the narrow open upper end 14 thereof. The semi-spherical holding portion 18 has an open upper end 20 and an arcuate closed lower end 22. The semi-spherical holding portion 18 is adapted for holding quantities of food and water therein. The arcuate closed lower end 22 is elevated with respect to the wide open lower end 16 of the bowl portion 12. Note FIG. 2. The pressure sensor 24 is secured to the arcuate closed lower end 22 of the semi-spherical holding portion 18 of the bowl portion 12. Note FIG. 2. The pressure sensor 24 includes an upper sensor 26 that is secured to the arcuate closed lower end 22 of the semi-spherical holding portion 18 and a lower sensor 28 that is positionable against the recipient surface.

The speaker 30 is positioned under the wide open lower end 16 of the bowl portion 12 adjacent to the pressure sensor 24. The speaker 30 is in communication with the pressure sensor 24. The speaker 30 has a preprogrammed announcement stored therein.

In use, the bowl portion 12 is filled with either food or water which will sit within the semi-spherical holding portion 18. The weight of the food or water will put downward pressure onto the pressure sensor 24. Once that weight has been removed from the pressure sensor 24, due to the consumption of the food or water by the pet, the speaker 30 will be signaled by the pressure sensor 24, and the preprogrammed announcement will be heard. This announcement can come in any form, such as the sounds associated with the particular pet or a general statement in a human voice indicating the need for food or water or even a simple monotone alarm. Once food or water is added to the bowl portion 12, the speaker 30 will stop. Alternately, by lifting the bowl portion 12 off of the recipient surface will cause the speaker 30 to deactivate.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pet bowl with means to notify a pet owner that the bowl is empty for letting a pet owner know that their pet is without food or water so that the bowl can be refilled comprising, in combination:

a bowl portion having a generally frustoconical configuration, the bowl portion having a narrow open upper end and a wide open lower end, the wide open lower end being positionable on a recipient surface, the bowl portion including a semi-spherical holding portion secured to the narrow open upper end thereof, the semi-spherical holding portion having an open upper end and an arcuate closed lower end, the semi-spherical holding portion adapted for holding quantities of food and water therein, the arcuate closed lower end being elevated with respect to the wide open lower end of the bowl portion;

a pressure sensor secured to the arcuate closed lower end of the semi-spherical holding portion of the bowl portion, the pressure sensor including an upper sensor secured to the arcuate closed lower end of the semi-spherical holding portion and a lower sensor positionable against the recipient surface;

a speaker positioned under the wide open lower end of the bowl portion adjacent to the pressure sensor, the speaker being in communication with the pressure sensor, the speaker having a preprogrammed announcement stored therein.

2. A pet bowl with means to notify a pet owner that the bowl is empty for letting a pet owner know that their pet is without food or water so that the bowl can be refilled comprising, in combination:

a bowl portion adapted for holding quantities of food and water therein and being positionable on a recipient surface;

a pressure sensor secured to the bowl portion, the pressure sensor including an upper sensor secured to the bowl and a lower sensor positionable against the recipient surface;

a speaker positioned under the bowl portion adjacent to the pressure sensor, the speaker being in communication with the pressure sensor, the speaker having a preprogrammed announcement stored therein.

* * * * *